United States Patent
Karam (10) Patent No.: US 8,234,086 B2
(45) Date of Patent: Jul. 31, 2012

(54) DETECTION OF MULTIPLE POWERED DEVICES CONNECTED TO AN INLINE POWER DELIVERY CHANNEL

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 689 days.

(21) Appl. No.: 12/390,737

(22) Filed: Feb. 23, 2009

(65) Prior Publication Data

US 2010/0217447 A1    Aug. 26, 2010

(51) Int. Cl.
*G01R 21/00* (2006.01)
(52) U.S. Cl. ............... 702/60; 702/117; 702/189
(58) Field of Classification Search .......... 706/14, 706/46, 62; 702/60, 117, 189; 700/286, 700/303
See application file for complete search history.

(56) References Cited

U.S. PATENT DOCUMENTS

| 7,320,077 B2 * | 1/2008 | Kim ............... 713/300 |
| 7,483,797 B2 * | 1/2009 | Nambu ............ 702/60 |
| 7,814,340 B2 * | 10/2010 | Heath et al. ..... 713/300 |
| 2006/0100799 A1 | 5/2006 | Karam |

FOREIGN PATENT DOCUMENTS

WO    2007027673 A2    3/2007

\* cited by examiner

*Primary Examiner* — Mohamed Charioui
*Assistant Examiner* — Elias Desta
(74) *Attorney, Agent, or Firm* — BainwoodHuang (57) ABSTRACT

Power sourcing equipment in a power over Ethernet (POE) system detects the connection of multiple powered devices to an inline power delivery channel to enable coherent power sharing among the devices. The PSE applies a standard detection signal (such as a detection voltage) to the power delivery channel, then detects and interprets a responsive signal (such as a detection current) which would normally be either zero or a non-zero value indicating the presence of one powered device. The PSE determines whether the second detection signal indicates that multiple powered devices may be connected, for example by detecting its value as a multiple or sub-multiple of a standard responsive signal. If so, the PSE provides additional distinct signals each eliciting a distinct individual response signal from a corresponding powered device, and detects each distinct individual response signal to identify the powered devices connected to the power delivery channel.

27 Claims, 4 Drawing Sheets

DETECTION OF MULTIPLE POWERED DEVICES CONNECTED TO AN INLINE POWER DELIVERY CHANNEL

BACKGROUND

The invention is generally related to the field of inline power delivery.

Electronic systems make use of inline power delivery to provide electrical operating power using the same conductors that are also used to carry data or information. Systems in use today include those referred to as "power over Ethernet" (POE), in which 48 volt DC power is carried on the same unshielded twisted pairs used to carry high speed Ethernet digital communications signals of 10/100 Mb/s or 1 Gb/s.

Inline power systems including POE systems employ certain signaling prior to the application of full DC power to determine whether a valid powered device (PD) capable of receiving inline power is attached to the conductors of a power delivery channel. Various forms of such signaling are used. According to one family of published standards generally falling within IEEE standard 802.3 (including 802.3af and the newer 802.3at), this signaling includes a "detection" operation and a separate "classification" operation, both of which involve the application of a signaling voltage on the power delivery channel by a power sourcing equipment (PSE) and a responsive signaling current generated on the power delivery channel by the PD. The signaling is based on a "point to point" assumption, i.e., that the PSE is connected to at most one PD by the power delivery channel. During detection, the PD presents a predetermined detection resistance of 25 kOhms to the power delivery channel, which is detected by the PSE as a current of (Vdet/25 k) where Vdet is the value of a detection voltage applied by the PSE. During classification, the PD conducts one of a set of predetermined classification currents in response to a classification voltage, the classification current indicating a "class" to which the PD belongs in terms of its power needs.

US published patent application 2006/0100799 A1 discloses various configurations in which multiple PDs are powered from a PSE via a power delivery channel. FIG. 4A shows a device 50 which is a power tap dongle having a connector 52 for connection to a PSE and a connector 54 for connection to a PD. In one embodiment, a controller 58 provides an identity network signal back to a PSE coupled with first connector 52 so that inline power may be provided. The device 50 may be adapted to act as a PSE device to determine if an attached device at the connector 54 has an appropriate identity network so that inline power may be provided to it. The controller 58 handles the inline power negotiations for device 50. The device 50 may provide a connection to enable the PSE and a device attached to connector 54 to engage in communications to establish/adjust power levels.

BRIEF DESCRIPTION OF THE DRAWINGS

Certain objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

A technique is disclosed for indicating/detecting the presence of multiple powered devices connected to a power delivery channel of a power sourcing equipment, so that power supplied by the power sourcing equipment can be shared among the multiple powered devices in a coherent and well-controlled manner.

A disclosed method includes performing a first operation including (a) applying a standard first detection signal (e.g., a detection voltage or current) to the power delivery channel and (b) detecting and interpreting a detected value of a second detection signal (e.g. a detection current or voltage) provided by the power delivery channel in response to the first detection signal. The first operation is a detection operation in which one standard response may be either the presence or absence of a predetermined value of the second detection signal (such as a predetermined detection current Idet) indicating the presence or absence of a single powered device on the power delivery channel. In the disclosed method, the interpreting includes determining whether the detected value of the second detection signal indicates that multiple powered devices may be connected to the power delivery channel. This may take the form, for example, of detecting a current having a value of n*Idet or Idet/n, where n is an integer greater than one. This type of detection can permit n powered devices to each apply a standard detection resistance to the channel, resulting in a non-standard detection signature that is interpreted by the power sourcing equipment as indicating that multiple PDs may be connected.

Upon determining in the first operation that multiple powered devices may be connected to the power delivery channel, a second operation is performed which includes providing a plurality of distinct signals to the power delivery channel, each distinct signal eliciting a distinct individual response signal from a corresponding one of the powered devices connected to the power delivery channel, and detecting each distinct individual response signal to identify the powered devices connected to the power delivery channel. Several such distinct signals and responses are described herein. The second operation confirms that multiple powered devices are indeed connected to the power delivery channel, and identifies each such connected powered device.

The disclosed technique can operate while enabling both the powered device and the power sourcing equipment to remain fully compliant with power over Ethernet standards, and upon permission under proprietary modes that may be pseudo-compliant or totally proprietary.

DESCRIPTION OF EXAMPLE EMBODIMENTS

Figure 1:
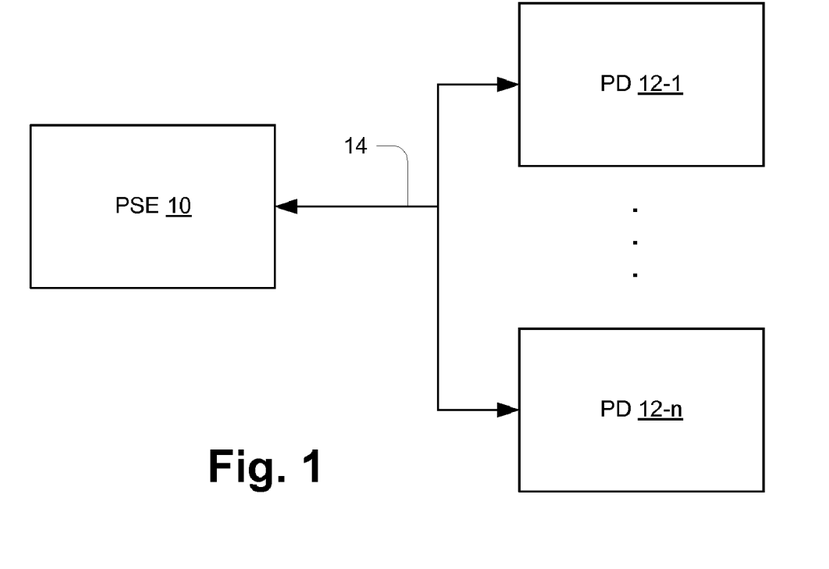
FIG. 1 is a block diagram of an inline power delivery system.

FIG. 1 shows a system in which a power sourcing equipment (PSE) 10 is connected to a plurality of powered devices (PDs) 12 (shown as 12-1, . . . , 12-n) via a single power delivery channel 14. The power delivery channel 14 may include two or four twisted pairs of an unshielded twisted pair cable, such as commonly referred to by the description "category 5" or "category 6" cable. Because a given pair or pairs of a physical cable is/are generally used to provide only a point-to-point connection, it will be appreciated that multiple physical cables are interconnected in some manner to achieve the single power delivery channel 14 interconnecting more than two devices. For example, there may be an intermediate device (not shown) serving as a wiring hub that provides interconnections among all cables to the various devices 10, 12. Alternatively, the PDs 12 may be arranged in serial or "daisy-chain" fashion with each successive PD connected to two neighboring PDs by respective cables. Variations and combinations of these approaches may be used. Generally, any arbitrary number of PDs 12 may be supported, although it is contemplated that in many embodiments it may be necessary to support only a small number such as two or three, depending on the nature of the application. Additionally, a single cable may support multiple power delivery channels 14. For example, if 4-pair cable is used and each power delivery channel requires only 2 pairs, then the cable can support two separate power delivery channels, and each set of pairs may support multiple PD devices.

In one class of embodiments, a system such as shown in FIG. 1 operates according to the family of so-called "power over Ethernet" (POE) standards, IEEE 802.3af and 802.3at. In these systems, the PSE 10 provides a maximum amount of DC operating power at a DC operating voltage of 48 volts DC. Under the older 802.3af standard, the maximum operating power is approximately 15 watts, whereas under the newer 802.3at standard, the maximum operating power is approximately 30 watts. The standards contemplate a single point-to-point power delivery channel from a single PSE 10 to a single PD 12, and this aspect is discussed more below. But with respect to power delivery per se, a configuration such as shown in FIG. 1 having each device operating within standard-specified voltages and currents is quite feasible, with each PD 12 receiving a respective share of the total operating current supplied to the power delivery channel 14 by the PSE 10. Configurations of this type may be desirable to provide desired system functionality while making efficient use of cabling and other system resources. To achieve such configurations it may be necessary or desirable to modify certain aspects of standard operation that reflect the (inapplicable) point-to-point assumption.

Under the standards, the delivery of power is preceded by a detection/classification operation in which the PSE 10 engages in signaling to determine whether a valid PD 12 is connected to the power delivery channel, as well as to determine the power consumption characteristics of such a connected PD 12. In a standard detection operation, the PSE 10 generates successive DC voltages each less than 30 volts on the power delivery channel 14, measures respective DC currents drawn by the power delivery channel 14, and calculates a ratio of the difference between the voltages to the difference between the currents. The standards specify that this ratio must be within a small range of $2.5 \times 10^4$, corresponding to a resistance of 25 kOhms. Under the point-to-point assumption, a single PD 12 can cause the correct detection currents to be generated by connecting a 25 kOhm resistor across conductors of the power delivery channel 14. The response of the PD in a detection operation is sometimes referred to as the "signature" of the PD. In a standard classification operation that follows the detection operation, the PSE 10 generates a somewhat higher DC classification voltage (in range of 15-20 volts) and measures a DC classification current conducted by the power delivery channel 14. Under the standards, different classification currents falling in the range of 0-45 mA correspond to different maximum amounts of power to be drawn from the PSE 10. Under the point-to-point assumption, a single PD 12 can use a simple circuit which generates a desired classification current in response to the presence of the classification voltage.

The standard detection and classification operations may not work correctly when multiple standard PDs 12 are attached to a single power delivery channel 14 such as in FIG. 1. With respect to detection, if each PD 12 presents a 25 kOhm resistance to the power delivery channel 14, it may result in a net resistance of (25/n) kOhms (n instances of 25 kOhm in parallel) which is not seen as a valid PD signature by a standard PSE 10. With respect to classification, the PSE 10 will detect a total classification current equal to the sum of the individual classification currents conducted by the respective PDs 12, which may not map to the correct overall power class or even to any valid power class at all. Thus, if multiple PDs 12 are to be powered from a single power delivery channel 14, it is necessary to somehow address these issues of detection and classification to enable power delivery operation to work correctly.

Figure 2:
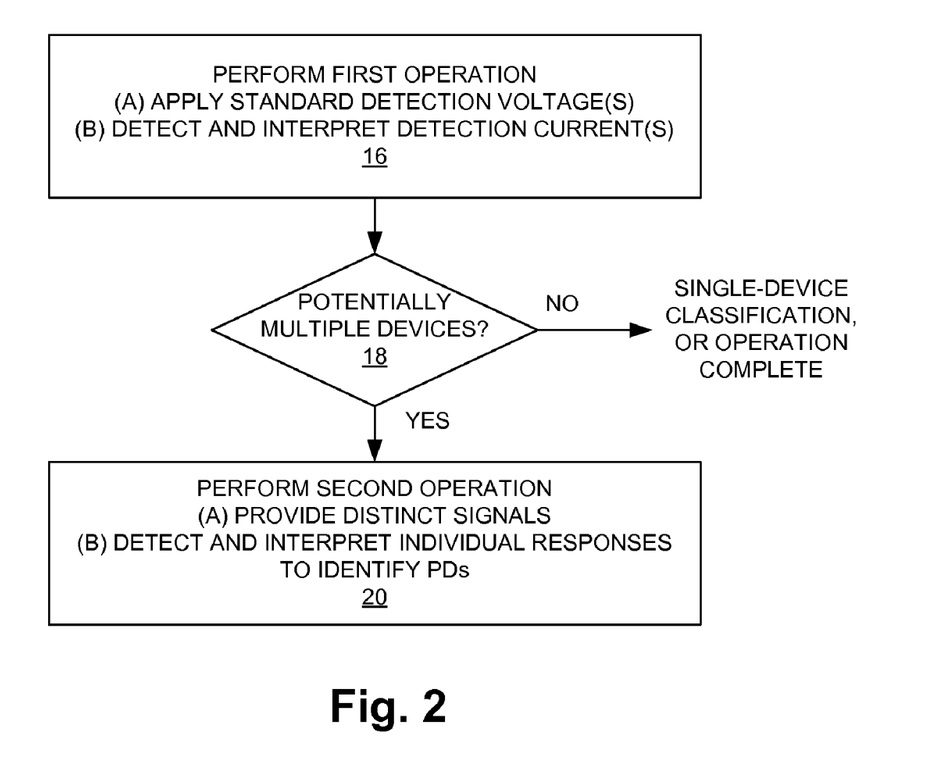
FIG. 2 is a flow diagram of a detection operation in the system of FIG. 1.

FIG. 2 shows operation of the PSE 10 aimed at determining whether there are multiple PDs 12 connected to the power delivery channel 14. At 16, the PSE 10 performs a first operation which includes (a) applying one or more detection voltages to the power delivery channel 14, and (b) detecting and interpreting detected values of detection currents drawn by the power delivery channel 14 in response to the detection voltages. The first operation uses standard detection voltages (less than 30 volts). Under the standards, the PSE 10 normally looks for values of the detection currents which indicate the presence of a valid, powerable PD 12. For example, the two detection voltages Vdet1 and Vdet2 are employed with corresponding measured detection currents, the difference between the detection currents should be (Vdet1−Vdet2)/25 k. If other detection currents are drawn that yield a different value (including zero for example), under the standards it indicates that power should not be supplied by the PSE. In the process of FIG. 2, however, the interpretation of the detected values of the detection currents by the PSE 10 includes determining whether the values indicate that multiple powered devices may be connected to the power delivery channel. This operation may include detecting other, non-standard specific values of the detection currents, and/or interpreting the standard-specified value of the detection currents in a non-standard way (i.e., as signifying not that one single PD is attached but that multiple PDs (some of which may be non-standard) may be attached). Several examples of this operation are described below.

At 18 in the process of FIG. 2, further operation depends on the result of the first operation. If the detected values of the detection currents indicate that multiple PDs 12 may be attached, then operation proceeds to step 20. Otherwise, either a single-PD classification operation is performed (standard-based) or operation is complete.

At 20, a second operation is performed which includes (a) providing multiple distinct signals to the power delivery channel, each distinct signal eliciting a distinct individual response signal from a corresponding powered device which may be connected to the power delivery channel, and (b) detecting each distinct individual response signal to identify the powered devices connected to the power delivery channel. The second operation may employ non-standard voltage/current signaling between the PSE 10 and the PDs 12, and examples are provided below. As an alternative or supplement, it may be desirable to use an entirely separate signaling mechanism for the second operation, and examples of this kind of operation are also provided below.

Three general types of multiple-PD detection processes that all follow the general outline of FIG. 2 are now presented.

A first general type of multiple-PD detection process may be referred to as "multi-mode", as the PDs 12 generally alternate between different modes of responding during detection/classification cycles, providing an opportunity for each PD 12 to provide an individual response signal and thereby enable the PSE 10 to determine how many PDs are attached to the power delivery channel 14. When n PDs 12 are attached to the channel 14, the PSE 10 is configured to generate at least n classification or detection/classification cycles, and each attached PD 12 provides a valid detection/classification signature on only every nth such cycle. The PDs 12 are configured so that their respective valid cycles are offset from each other.

Figure 3:
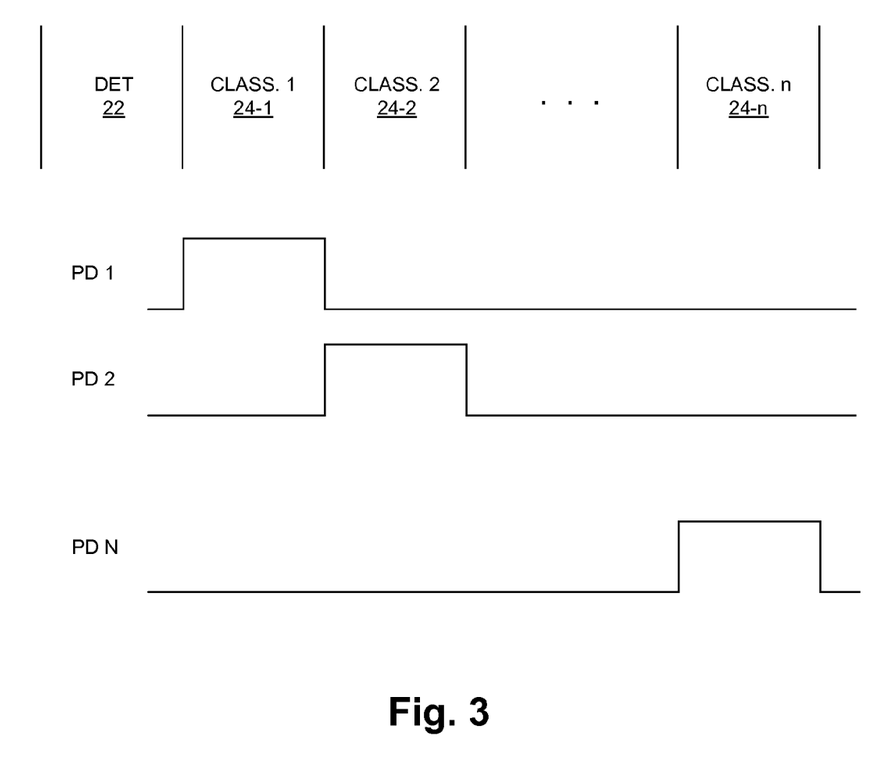
FIG. 3 is a timing diagram illustrating a first type of the detection operation of FIG. 2.

FIG. 3 illustrates one example of such operation. In FIG. 3, the PSE 10 performs one detection cycle 22 and n classification cycles 24 (24-1 through 24-n). During the detection cycle 22, it may be that only one of the PDs 12 provides the required 25 kOhm signature resistance. Alternatively, perhaps all the PDs 12 provide respective signature resistances to the power delivery channel 14. The PDs 12 may be configured to each provide a resistance of (n*25 kOhm), so that the parallel combination equals the standard 25 kOhm and is correctly detectable by the PSE 10. Alternatively, if each PD 12 generates the standard 25 kOhm resistance, then the PSE 10 must be configured to recognize a resistance of (1/n)(25 kOhm) as a potentially valid PD signature, subject to the remaining operation of identifying n distinct attached PDs 12. It will be appreciated that such a PSE 10 would not be operating in compliance with the POE standards. However, the risk of such a PSE providing power to a device that has a similar signature is very small, because more checking is done to enhance the validity of the detection of non-25 k signatures.

During each classification cycle 24, the PSE 10 generates a classification voltage (which may be standard-compliant) and only one corresponding PD 12 responds by conducting a classification current—the other PDs 12 conduct zero current. Thus in cycle 24-1, for example, a PD identified as "PD 1" conducts a non-zero classification current while the PDs identified as "PD 2" through "PD n" all conduct zero classification current. In cycle 24-2, PD 2 conducts a non-zero current while the other PDs conduct zero current, etc. During this operation, the PSE 10 monitors the response of each PD 12 (i.e., the value of the classification current conducted by each PD 12 during its respective classification cycle 24) to identify the presence of all n PDs 12.

In an alternative form of the process of FIG. 3, both the detection and classification operations are repeated n times, and each PD 12 is configured to respond only during a respective one of the cycles with both a signature resistance and a classification current.

In the process of FIG. 3, each classification cycle 24 employs the same type of signaling, i.e., a classification voltage from the PSE 10 and a corresponding classification current from one of the PDs 12. In another alternative form, the different classification cycles 24 may employ different types of signaling. For example, one classification cycle 24 may employ a standard classification voltage from the PSE 10 and classification current from one PD 12, while during a second classification cycle the PSE 10 and another PD 12 may exchange a message by some other form of signaling, such as by an exchange of voltages and currents at specific times in the detect/class cycles or packets between the PSE 10 and the other PD 12. Another alternative may employ a so-called "single-pair identity network" which permits detection of a special identification circuit appearing across only a single pair of a two-pair power delivery channel (in contrast to standard-based identification which operates across both pairs), as described for example in US Patent Publication 2006/0291405. Such a detection would use the Ethernet PHY and data-type signaling. Yet another alternative may be the use of a pair-pair differential identity network that enables PHY based detections, as described for example in U.S. Pat. No. 662,675. In particular, in one configuration one PD 12 provides standard-based detection and classification, while a second PD 12 utilizes a single-pair identity network and third PD 12 employs a pair-to-pair differential identity network.

As noted, the process of FIG. 3 has a non-standard aspect to it. It could be employed, for example, in a custom environment that is not specified to conform to the POE standards, and in such case the non-standard operation may be automatic or even the only operation possible. It may be desirable, however, to utilize a standard-compliant mechanism to trigger the non-standard behavior, so that the non-standard operation only occurs in a negotiated fashion. For example, during the detection cycle 22 the PSE 10 may generate the detection voltage having a characteristic that can be recognized by certain PDs 12 as signifying that the PSE 10 is capable of the non-standard operation. This characteristic could be a certain pulse duration or a dwell at a certain PSE voltage while the PDs detect and introduce responses during such a dwell, even while the overall detection voltage remains within the definition of the standard. A PD 12 that recognizes this signal and is capable of the non-standard operation can then operate in the non-standard fashion, knowing that the PSE 10 is capable of properly interpreting such operation (as described above with reference to FIG. 3). Such a PD 12 preferably signals its ability to operate in the non-standard way back to the PSE 10, for example by applying a characteristic to the detection current that it conducts during the detection cycle that indicates that the PD 12 is capable of the non-standard operation. When the PSE 10 detects this characteristic of the detection current, it then employs the non-standard operation (i.e., multiple classification cycles each looking for a distinct classification current from a respective single one of the PDs 12) rather than the standard classification operation of using only one classification cycle and detecting only one classification current according to the point-to-point assumption).

In a second general type of multiple-PD detection process, one PD 12 provides a standard detection/classification response while one or more other PDs 12 do not present any response to the standard detection/classification operation. In this case, the PSE 10 proceeds to provide operating power to the power delivery channel 14 based on the response from the one responding PD. Subsequently, as the voltage is ramping up to 48 volts, the PD(s) 12 that were silent during standard detection/classification now provide respective signatures that identify them, and the PSE 10 monitors the current drawn by the power delivery channel 14 during this transition period to detect such signatures and identify the other PD(s) 12.

Figure 4:
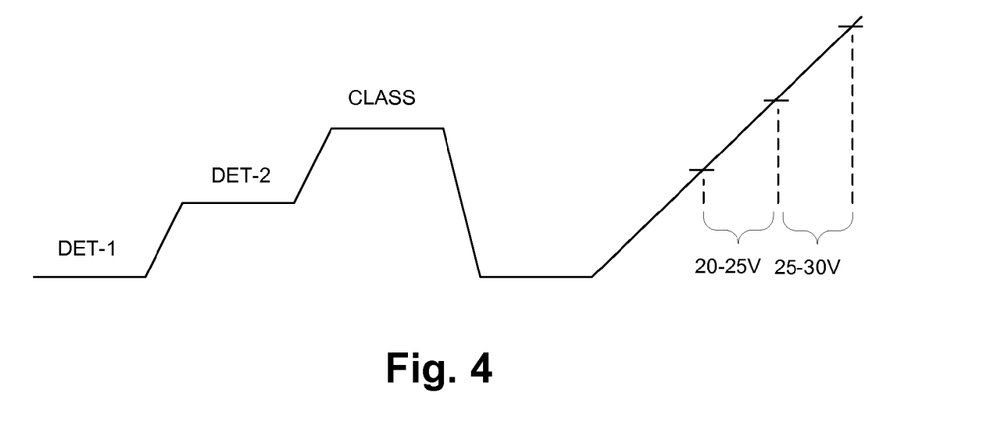
FIGS. 4 and 5 are waveform diagrams illustrating second and third types of the detection operation of FIG. 2.

This operation is illustrated in FIG. 4, which shows the voltage applied by the PSE 10 to the power delivery channel 14 over time. In compliance with the standard, the detection voltages during two detection periods DET-1 and DET-2 are less than 15 volts, and the classification voltage during a classification period CLASS is in the range of 15-20 volts. Thereafter the voltage rises toward its normal operating value of 44-57 volts, and during the transition to that voltage it passes through the 20-30 volt region. This region is less than a so-called "undervoltage lockout" or UVLO voltage below which a PD 12 should not conduct operating current. In this region, the behavior of the PD 12 regarding the current it can conduct from the power delivery channel 14 is unspecified. A PD 12 can generate a signaling current on the power delivery channel 14 that is detected by the PSE 10 to identify the presence of such PD 12. If desired, the PD 12 can generate two different signaling currents in separate sub-regions, i.e., one signaling current in the region of 20-25 volts and a different signaling current in the region of 25-30 volts. This kind of signaling may provide for more reliable identification of the PD 12. If it is desired to detect more than one additional PD 12 using this technique, one possibility is to have one PD 12 generate a signaling current in one sub-region (e.g. 20-25 volts) and another PD 12 generate a different signaling current in another sub-region (e.g. 25-30 volts). This arrangement would permit up to three PDs 12 to share a single power delivery channel 14.

A variation on the above approach is for the PSE 10, upon detecting a signaling current in the region of 20-30 volts as it is applying normal operating power, to stop the transition to normal operating power and instead enter another state in which it engages in other signaling to detect and classify the one or more additional PDs 12 that are now known to be attached to the power delivery channel 14. Presumably such signaling would be non-standard.

Figure 5:
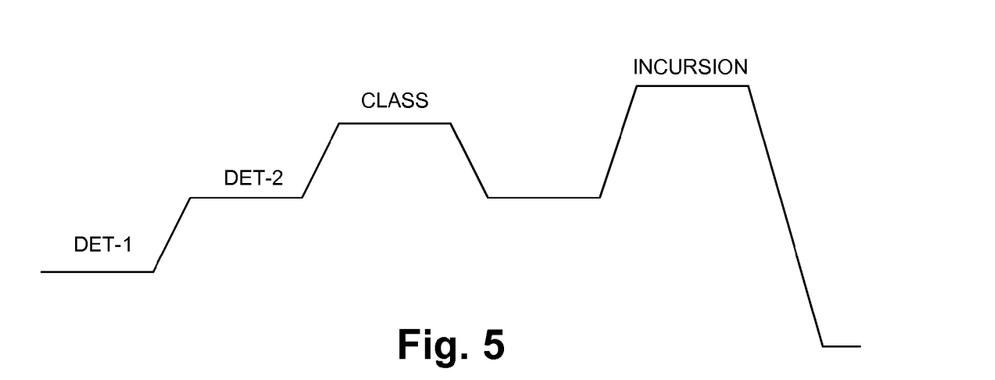

A third general type of multiple-PD detection process involves the use of a special signaling feature after standard detection/classification. The operation is illustrated in FIG. 5. After the standard detection and classification periods DET-1, DET-2 and CLASS, an "incursion" cycle employing a voltage of about 25 volts is utilized. This signal indicates to one or more of the PDs 12 that it should provide a non-standard response in one of a variety of ways in order to enable the PSE 10 to identify its presence. For example, one PD 12 may respond during the incursion cycle by presenting a non-zero classification current, while another PD 12 may not conduct any classification current. In this case the PSE 10 can identify the one responding PD 12, and can also deduce the identity/class of the non-responding PD 12 by subtracting the current drawn in the incursion cycle from the classification current drawn during the normal classification period CLASS (in which it is presumed that both PDs 12 provide a standard classification current, such that during this period the PSE 10 measures the sum of those classification currents). Alternatively, the incursion voltage may signal one or more PDs 12 to change their classification for a subsequent detection/classification operation, which could enable the PSE 10 to individually identify such PD(s) 12. Yet another alternative is for one PD 12 to delay its assertion of a classification current during the incursion cycle. This can enable the PSE 10 to individually identify a non-delayed PD 12 based on a first classification current drawn during an initial part of the incursion cycle, and then identify the delayed PD 12 based on a second, composite classification current drawn during a latter part of the incursion cycle.

Figure 6:
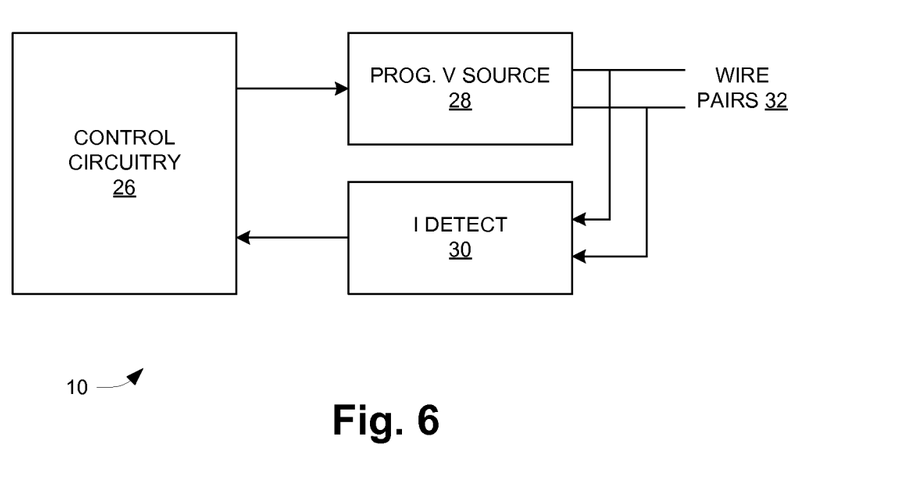
FIGS. 6 and 7 are block diagrams of a power sourcing equipment and powered device respectively in the system of FIG. 1.

FIG. 6 shows a general block diagram of a PSE 10. It includes control circuitry 26, a programmable signal source shown as a programmable voltage source (PROG V SOURCE) 28, and signal detection circuitry shown as current detection circuitry (I DETECT) 30, with the latter two connected to wire pairs 32 of the power delivery channel 14. In operation, the programmable voltage source 28 is operative to apply voltages across the wire pairs 32 (such as the signaling voltages shown in FIGS. 4 and 5 for example) in response to control inputs from the control circuitry 26, and the current detection circuitry 30 detects currents flowing on the wire pairs 32 and provides corresponding indications of the values of the currents to the control circuitry 26. The control circuitry 26 controls the programmable voltage source 28 and uses the indications from the current detection circuitry 30 to carry out the overall sequencing of signaling voltages such as shown in FIGS. 4 and 5 and the interpretation of currents on the wire pairs 32 as indicated by the current detection circuitry 30.

Figure 7:
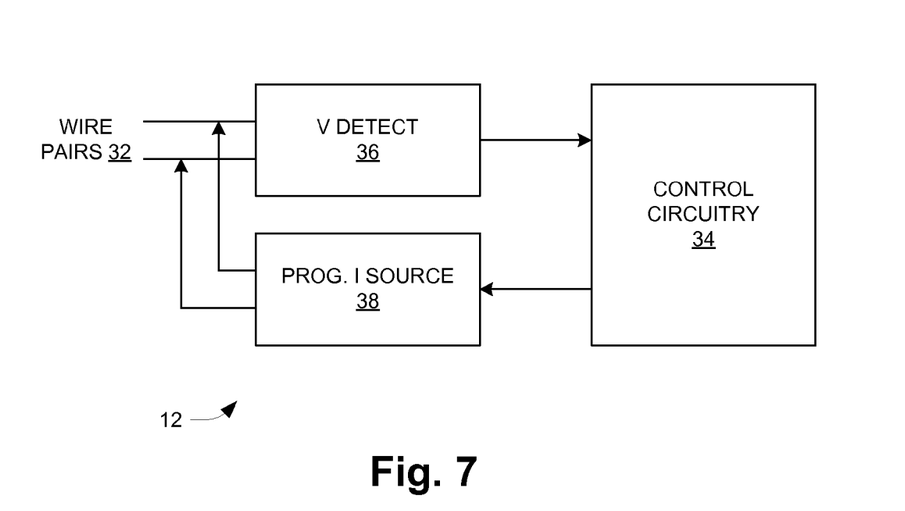

FIG. 7 shows a general block diagram of a PD 12. It includes control circuitry 34, signal detection circuitry shown as voltage detection circuitry (V DETECT) 36, and a programmable signal source shown as programmable current source (PROG I SOURCE) 38, and with the latter two connected to the wire pairs 32 of the power delivery channel 14. In operation, the programmable current source 38 is operative to apply currents to the wire pairs 32 (such as the signaling currents described above with reference to FIGS. 4 and 5 for example) in response to control inputs from the control circuitry 34, and the voltage detection circuitry 36 detects voltages across the wire pairs 32 and provides corresponding indications of the values of the voltages to the control circuitry 34. The control circuitry 34 controls the programmable current source 38 and uses the indications and power from the voltage detection circuitry 36 to carry out the application of signaling currents such as described above and the interpretation of voltages on the wire pairs 32 as indicated by the voltage detection circuitry 36.

While various embodiments of the invention have been particularly shown and described, it will be understood by those skilled in the art that various changes in form and details may be made therein without departing from the spirit and scope of the invention as defined by the appended claims. In particular, while the technique as described above employs a detection voltage as the first detection signal generated by the PSE and detection current(s) as the second detection signals provided by the PDs, in alternative embodiments other specific forms of these detection signals may be used. In one particular alternative, a detection current may be utilized as the first detection signal generated by the PSE and detection voltage(s) as the second detection signals provided by the PDs. It will be appreciated that in such alternative embodiments the specific configurations of the PSE 10 and PD 12 as shown in FIGS. 6 and 7 will change accordingly. Other alternatives falling within the claims below are possible.

What is claimed is:

1. A method of detecting the presence of multiple powered devices connected to a power delivery channel of a power sourcing equipment, comprising:

performing a first operation including (a) applying a standard first detection signal to the power delivery channel and (b) detecting and interpreting a detected value of a second detection signal provided to the power delivery channel in response to the first detection signal, the first operation being a detection operation for which one predetermined value of the second detection signal indicates the presence of a single powered device and the absence of the one predetermined value of the second detection signal indicates the absence of a powered device on the power delivery channel, the interpreting including determining whether the detected value of the second detection signal indicates that multiple powered devices are connected to the power delivery channel; and upon determining in the first operation that the detected value of the second detection signal indicates that multiple powered devices are connected to the power delivery channel, performing a second operation including (c) providing a plurality of distinct signals to the power delivery channel, each distinct signal eliciting a distinct individual response signal from a corresponding one of the powered devices connected to the power delivery channel, and (d) detecting each distinct individual response signal to identify the powered devices connected to the power delivery channel.

2. A method according to claim 1 wherein the second detection signal is a detection current and the predetermined value is a predetermined value Idet of the detection current, and wherein determining whether the detected value of the second detection signal indicates that multiple devices are connected comprises measuring a value of the detection current as one of n*Idet and Idet/n, where n is an integer greater than one.

3. A method according to claim 1 wherein the second operation comprises a plurality of distinct device classification cycles each including applying a classification voltage to the power delivery channel and detecting and interpreting a detected value of a classification current drawn by the power delivery channel in response to the classification voltage, the distinct device classification cycles including at least (1) a first classification cycle during which a first one of the powered devices conducts a first non-zero device classification current and a second one of the powered devices conducts zero device classification current, and (2) a second classification cycle during which the first one of the powered devices conducts zero device classification current and the second one of the powered devices conducts a second non-zero device classification current.

4. A method according to claim 1 wherein the second operation comprises a plurality of distinct device classification operations including (1) one standard device classification operation including (a) applying a classification voltage to the power delivery channel and (b) detecting and interpreting a detected value of a classification current drawn by the power delivery channel in response to the classification voltage, and (2) at least one additional device classification operation that employs signaling on the power delivery channel different from the classification voltage and classification current.

5. A method according to claim 4 wherein the additional device classification operation employs at least one of (i) a single-pair identity network appearing across only a single pair of two wire pairs of the power delivery channel, and (ii) a pair-pair differential identity network appearing across the two wire pairs of the power delivery channel.

6. A method according to claim 1 wherein:
interpreting the detected value of the second detection signal includes determining that the detected value indicates that the second operation is to employ the signals that elicit an individual response signal from the powered devices rather than employing a classification voltage of a standard device classification operation.

7. A method according to claim 1 wherein the second operation includes (1) one standard device classification operation including (a) applying a classification voltage to the power delivery channel and (b) detecting and interpreting a detected value of a classification current drawn by the power delivery channel in response to the classification voltage, the detected value of the classification current identifying a first one of the powered devices connected to the power delivery channel, and (2) applying an operating voltage to the power delivery channel and, during a transition to the operating voltage, detecting and interpreting a value of a signaling current conducted by the power delivery channel in response to the transition to the operating voltage, the signaling current identifying a second one of the powered devices connected to the power delivery channel.

8. A method according to claim 7 wherein the operating voltage is substantially 48 volts and the signaling current is conducted by the power delivery channel when a voltage in the range of 20-30 volts is applied to the power delivery channel.

9. A method according to claim 1 wherein the second operation includes a device classification operation including (a) applying a standard classification voltage to the power delivery channel, (b) detecting and interpreting a detected value of a classification current drawn by the power delivery channel in response to the standard classification voltage, (c) applying a non-standard voltage indicating to at least one of the powered devices that it is to provide a non-standard response in the device classification operation to distinctly identify the one powered device.

10. A method according to claim 9 wherein the second operation includes an incursion cycle during which the non-standard voltage is applied, the non-standard voltage being greater than the standard classification voltage.

11. A method of indicating the presence of one of a plurality of powered devices connected to a power delivery channel of a power sourcing equipment, comprising:
during a first operation, generating a second detection signal on the power delivery channel in response to a standard first detection signal on the power delivery channel, the first operation being a detection operation for which one predetermined value of the second detection signal indicates the presence of a single powered device and the absence of the one predetermined value of the second detection signal indicates the absence of a powered device on the power delivery channel, the second detection signal being generated with a value indicating that multiple powered devices are connected to the power delivery channel; and
during a subsequent second operation, generating a distinct individual response signal on the power delivery channel in response to a particular one of a plurality of distinct signals appearing on the power delivery channel, the distinct individual response signal identifying a particular powered device connected to the power delivery channel as distinct from other powered devices connected to the power delivery channel.

12. A method according to claim 11 wherein the second detection signal is a detection current and the predetermined value is a predetermined value Idet of the detection current, and wherein the value of the second detection signal is Idet/n, where n is an integer greater than one.

13. A method according to claim 11 wherein the second operation comprises a plurality of distinct device classification cycles during each of which a classification current is generated on the power delivery channel in response to a classification voltage on the power delivery channel, the distinct device classification cycles including at least (1) a first classification cycle during which the one powered device conducts a first non-zero device classification current, and (2) a second classification cycle during which the one powered device conducts zero device classification current.

14. A method according to claim 11 wherein:
the second detection signal has a value indicating to the power sourcing equipment that the second operation is to employ the signals that elicit an individual response signal from the powered devices rather than employing a classification voltage of a standard device classification operation.

15. A method according to claim 11 wherein the second operation includes (1) one device classification operation including generating zero classification current on the power delivery channel in response to a classification voltage appearing on the power delivery channel, and (2) during a subsequent transition to an operating voltage being applied to the power delivery channel, generating a signaling current on the power delivery channel in response to the transition to the operating voltage, the signaling current identifying the one of the powered devices connected to the power delivery channel.

16. A method according to claim 11 wherein the second operation includes a device classification operation including (a) generating a classification current on the power delivery channel in response to a standard classification voltage applied to the power delivery channel, and (b) during a subsequent incursion cycle in which a non-standard voltage is applied to the power delivery channel, generating a non-standard response on the power delivery channel to the subsequent non-standard voltage, the non-standard response distinctly identify the one powered device.

17. A power sourcing equipment, comprising:
a programmable signal source connected to a power delivery channel;
signal detection circuitry connected to the power delivery channel; and
control circuitry connected to the programmable signal source and the signal detection circuitry, the control circuitry being operative to control the operation of the programmable signal source to apply first signals to the power delivery channel and to receive indications from the signal detection circuitry of the values of second signals on the power delivery channel so as to detect the presence of multiple powered devices connected to the power delivery channel, the control including:
performing a first operation including (a) applying a standard first detection signal to the power delivery channel and (b) detecting and interpreting a detected value of a second detection signal provided by the power delivery channel in response to the first detection signal, the first operation being a detection operation for which one predetermined value of the second detection signal indicates the presence of a single powered device and the absence of the one predetermined value of the second detection signal current indicates the absence of a powered device on the power delivery channel, the interpreting including determining whether the detected value of the second detection signal indicates that multiple powered devices are connected to the power delivery channel; and
upon determining in the first operation that the detected value of the second detection signal indicates that multiple powered devices are connected to the power delivery channel, performing a second operation including (c) providing a plurality of distinct signals to the power delivery channel, each distinct signal eliciting a distinct individual response signal from a corresponding one of the powered devices connected to the power delivery channel, and (d) detecting each distinct individual response signal to identify the powered devices connected to the power delivery channel.

18. A power sourcing equipment according to claim 17 wherein the second operation comprises a plurality of distinct device classification cycles each including applying a classification voltage to the power delivery channel and detecting and interpreting a detected value of a classification current drawn by the power delivery channel in response to the classification voltage, the distinct device classification cycles including at least (1) a first classification cycle during which a first one of the powered devices conducts a first non-zero device classification current and a second one of the powered devices conducts zero device classification current, and (2) a second classification cycle during which the first one of the powered devices conducts zero device classification current and the second one of the powered devices conducts a second non-zero device classification current.

19. A power sourcing equipment according to claim 17 wherein:
interpreting the detected value of the second detection signal includes determining whether the detected value of the second detection signal indicates that the second operation is to employ the signals that elicit an individual response signal from the powered devices rather than employing a classification voltage of a standard device classification operation.

20. A power sourcing equipment according to claim 17 wherein the second operation includes (1) one standard device classification operation including (a) applying a classification voltage to the power delivery channel and (b) detecting and interpreting a detected value of a classification current drawn by the power delivery channel in response to the classification voltage, the detected value of the classification current identifying a first one of the powered devices connected to the power delivery channel, and (2) applying operating voltage to the power delivery channel and, during a transition to the operating voltage, detecting and interpreting a value of a signaling current conducted by the power delivery channel in response to the transition to the operating voltage, the signaling current identifying a second one of the powered devices connected to the power delivery channel.

21. A power sourcing equipment according to claim 17 wherein the second operation includes a device classification operation including (a) applying a standard classification voltage to the power delivery channel, (b) detecting and interpreting a detected value of a classification current drawn by the power delivery channel in response to the standard classification voltage, (c) applying a non-standard voltage indicating to at least one of the powered devices that it is to provide a non-standard response in the device classification operation to distinctly identify the one powered device.

22. A powered device, comprising:
a programmable signal source connected to a power delivery channel;
signal detection circuitry connected to the power delivery channel; and
control circuitry connected to the programmable signal source and the signal detection circuitry, the control circuitry being operative to control the operation of the programmable signal source to apply second signals to the power delivery channel and to receive indications from the signal detection circuitry of the values of first signals on the power delivery channel so as to indicate the presence of the powered device to a power sourcing equipment connected to the power delivery channel, the control including:
during a first operation, generating a second detection signal on the power delivery channel in response to a standard first detection signal on the power delivery channel, the first operation being a detection operation for which one predetermined value of the second detection signal indicates the presence of a single powered device and the absence of the one predetermined value of the second detection signal indicates the absence of a powered device on the power delivery channel, the second detection signal being generated with a value indicating that multiple powered devices are connected to the power delivery channel; and
during a subsequent second operation, generating a distinct individual response signal on the power delivery channel to a particular one of a plurality of distinct signals appearing on the power delivery channel, the distinct individual response signal identifying a particular powered device connected to the power delivery channel as distinct from other powered devices connected to the power delivery channel.

23. A powered device according to claim 22 wherein the second detection signal is a detection current and the predetermined value is a predetermined value Idet of the detection current, and wherein the value of the second detection signal is Idet/n, where n is an integer greater than one.

24. A powered device according to claim 22 wherein the second operation comprises a plurality of distinct device classification cycles during each of which a classification current is generated on the power delivery channel in response to a classification voltage on the power delivery channel, the distinct device classification cycles including at least (1) a first classification cycle during which the one powered device conducts a first non-zero device classification current, and (2) a second classification cycle during which the one powered device conducts zero device classification current.

25. A powered device according to claim 22 wherein:
the second detection signal has a value indicating to the power sourcing equipment that the second operation is to employ the signals that elicit an individual response signal from the powered devices rather than employing a classification voltage of a standard device classification operation.

26. A powered device according to claim 22 wherein the second operation includes (1) one device classification operation including generating zero classification current on the power delivery channel in response to a classification voltage appearing on the power delivery channel, and (2) during a subsequent transition to an operating voltage being applied to the power delivery channel, generating a signaling current on the power delivery channel in response to the transition to the operating voltage, the signaling current identifying the one of the powered devices connected to the power delivery channel.

27. A powered device according to claim 22 wherein the second operation includes a device classification operation including (a) generating a classification current on the power delivery channel in response to a standard classification voltage applied to the power delivery channel, and (b) during a subsequent incursion cycle in which a non-standard voltage is applied to the power delivery channel, generating a non-standard response on the power delivery channel to the subsequent non-standard voltage, the non-standard response distinctly identify the one powered device.

* * * * *